United States Patent [19]

Sifford et al.

[11] 4,283,682

[45] Aug. 11, 1981

[54] ERASURE ZONE DECISION FEEDBACK PHASE LOCK LOOP FOR CARRIER RECOVERY IN DATA MODEMS

[75] Inventors: Bruce M. Sifford, Los Altos; D. Thomas Magill, Palo Alto, both of Calif.

[73] Assignee: Ricoh Company, Ltd., Tokyo, Japan

[21] Appl. No.: 27,982

[22] Filed: Apr. 6, 1979

[51] Int. Cl.³ .............................................. H03D 3/18
[52] U.S. Cl. ...................................... 329/50; 375/42; 375/81
[58] Field of Search ........................ 329/50, 122, 124; 375/42, 81, 103

[56] References Cited

U.S. PATENT DOCUMENTS 3,710,261  1/1973  Low et al. ............................... 375/81
3,806,815  4/1974  Fletcher et al. ................. 329/122 X

OTHER PUBLICATIONS

Akashi et al., "A High Performance Digital QAM 9600 bit/s Modem", NEC Research and Development Journal, No. 45, Apr. 1977, pp. 38-49.

Primary Examiner—Siegfried H. Grimm
Assistant Examiner—Edward P. Westin
Attorney, Agent, or Firm—Claudé A. S. Hamrick

[57] ABSTRACT

An improved decision feedback phase lock loop having an erasure zone detector and a feedback loop interrupting switch responsive to the output of the erasure zone detector which cooperate to eliminate from the feedback loop those error signals corresponding to detected data falling within certain predetermined regions of the encoding constellation. The erasure zone detector compares the complex input signal to certain predetermined erasure zone reference signals so as to determine when the input signal falls within an erasure zone and correspondingly actuates the loop switch to prevent certain feedback error signals from being input to the loop filter.

6 Claims, 5 Drawing Figures

ERASURE ZONE DECISION FEEDBACK PHASE LOCK LOOP FOR CARRIER RECOVERY IN DATA MODEMS

BACKGROUND OF THE INVENTION

1. Field of the Invention

The present invention relates generally to modem apparatus for data communication systems and more particularly to an improved decision feedback phase lock loop for reducing decision errors by ignoring signals detected within certain predetermined erasure zones.

2. Description of the Prior Art

Decision feedback phase lock loops are commonly employed in data modems for recovering the transmitted carrier. See for example "A High Performance Digital QAM 9600 bit/s Modem" by Fumio Akashi et al, NEC Research and Development Journal No. 45, April 1977 pp. 38-49. A typical example of such phase lock loops is illustrated by the block diagram of FIG. 1 which includes a multiplier 10 for receiving a complex input signal and multiplying it by a feedback signal input 12 for demodulating purposes, a complex symbol detector 14 for detecting the particular constellation point received, a modulation removal phase detector 16 which compares the demodulated complex input signal to the complex data output signal and generates a signal proportional to the difference therebetween, a loop filter 18 which serves to smooth out differences between successive difference signals input thereto so as to ignore noise in such signals, and an exponential circuit 20 which converts the filtered difference signal into a complex form for feedback input to the multiplier 10 to accomplish demodulation. Note that (1) the input signal is in complex form, and (2) if the data modem is to operate over channels with phase jitter and phase hits, as commonly occurs, the phase lock loop bandwidth must be quite wide.

Although decision feedback loops have many advantages and are favored over other methods of carrier recovery, such as for example square-law type (or Costas-type) phase lock loops for biphase modulation, if the data detector does make an error, the phase detector will produce an incorrect phase adjustment which will tend to cause additional error. In other words, there is a tendency toward propagation of any errors that occur. This problem is most noticeable when data encoding constellations with a large number of elements are used in circuits having wide phase lock loop bandwidths. Since wide bandwidth is achieved by permitting the phase detector output to have a large effect on the phase estimate, when a decision error and resulting incorrect phase correction estimate occur, the latter can more easily adversely affect subsequent data decisions.

SUMMARY OF THE PRESENT INVENTION

It is therefore an object of the present invention to provide an improved decision feedback phase lock loop having means for preventing symbol detector error from adversely affecting subsequent data decisions.

Another object of the present invention is to provide a circuit for detecting signals falling within certain predetermined erasure zones of a particular data encoding constellation and for developing a feedback loop control signal when such detection is made.

Another object of the present invention is to provide an improved decision feedback phase lock loop including an erasure zone detector which excises erroneous or potentially erroneous signal information from the feedback loop.

Briefly, a preferred embodiment of the present invention includes the addition of an erasure zone detector and feedback loop interrupting switch responsive to the output of the erasure zone detector to a decision feedback phase lock loop so as to eliminate from the feedback loop those error signals corresponding to detected data falling within certain predetermined regions of the encoding constellation. Simply stated, this is accomplished by comparing the complex input signal to certain predetermined erasure zone reference signals so as to determine when the input signal falls within an erasure zone and the loop switch is actuated to prevent the feedback error signal from being input to the loop filter.

An important advantage of the present invention is that it provides a convenient means for avoiding incorrect reference signal adjustment when the correctness of a detected constellation point is in question.

Another advantage of the present invention is that it allows selective control of adjustment in the decision feedback phase lock loop of a carrier recovery circuit.

These and other objects and advantages of the present invention will no doubt become apparent to those to ordinary skill in the art after having read the following detailed description of a preferred embodiment which is illustrated in the several figures of the drawing.

IN THE DRAWING

DETAILED DESCRIPTION OF THE PREFERRED EMBODIMENT

Figure 1:
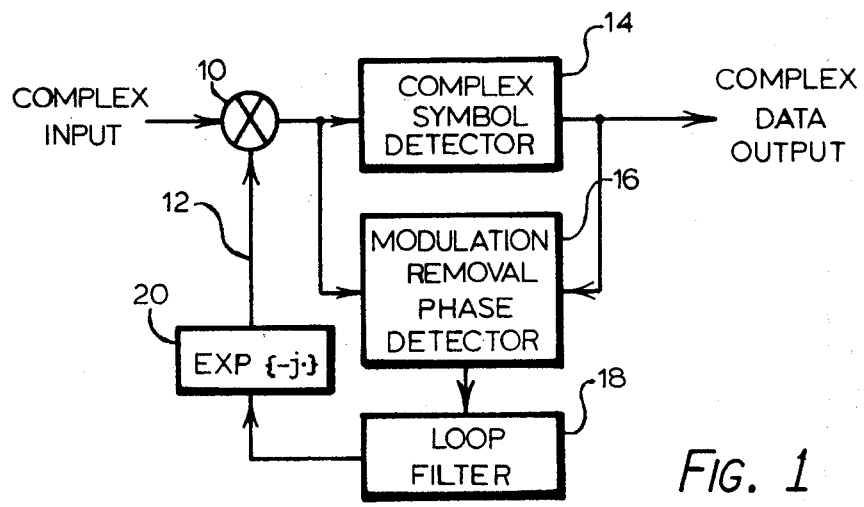
FIG. 1 is a block diagram showing a conventional decision feedback phase lock loop for carrier recovery in data modems.
Figure 2:
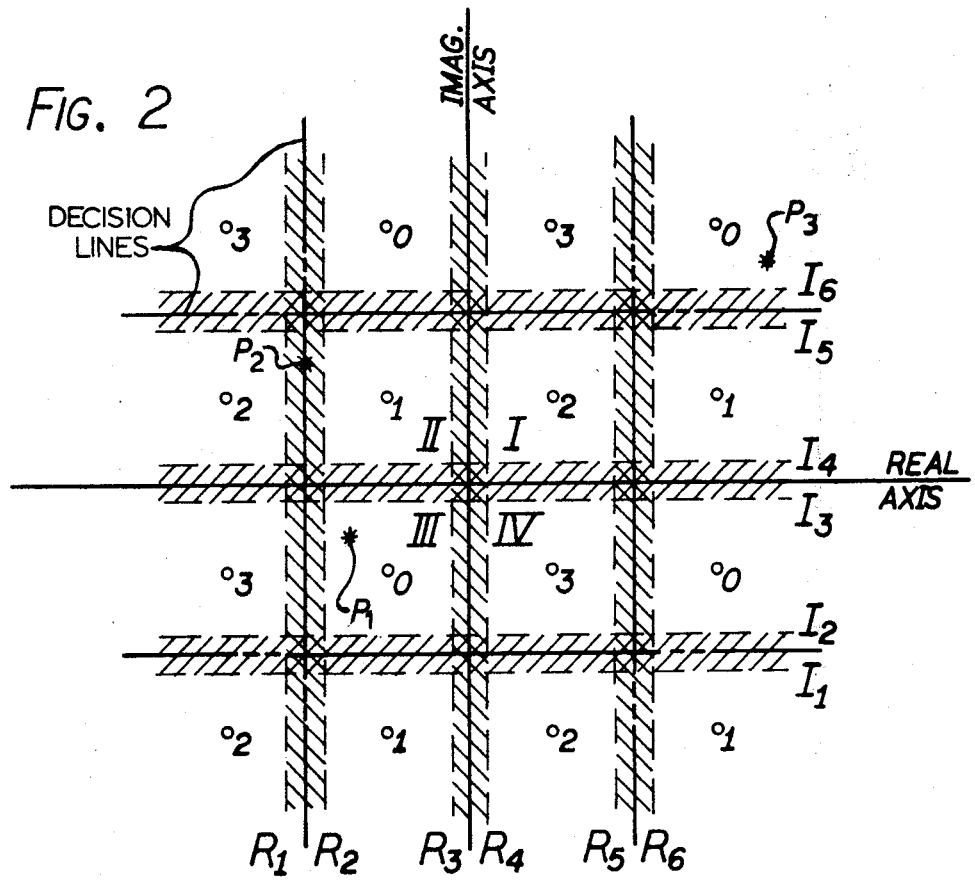
FIG. 2 is a diagram schematically illustrating erasure zones in a 4×4 QASK modulation constellation.

In FIG. 2 of the drawing a complex plane is shown illustrating the positions of the 16 data points in a 4×4 QASK modulation constellation. In addition, shaded areas are shown representing 6 erasure zones bounded by the real axis intercepts and imaginary axis intercepts $R_1$–$R_6$ and $I_1$–$I_6$, respectively. These arbitrarily selected erasure zones represent areas symmetrically disposed about decision lines in the complex plane and within which decision errors are likely to be made. Note also that examples of detected signals are depicted at points $P_1$, $P_2$ and $P_3$. Since it is highly likely that decisions based on inputs lying in the erasure zones are in error, it is advantageous not to adjust the carrier phase estimate based on these data. Accordingly, the general concept of the present invention is that if the input to the symbol detector lies within an erasure zone, the modulation removal phase detector output is turned off or "erased." Otherwise, the phase detector output is used to adjust the loop feedback signal.

Figure 3:
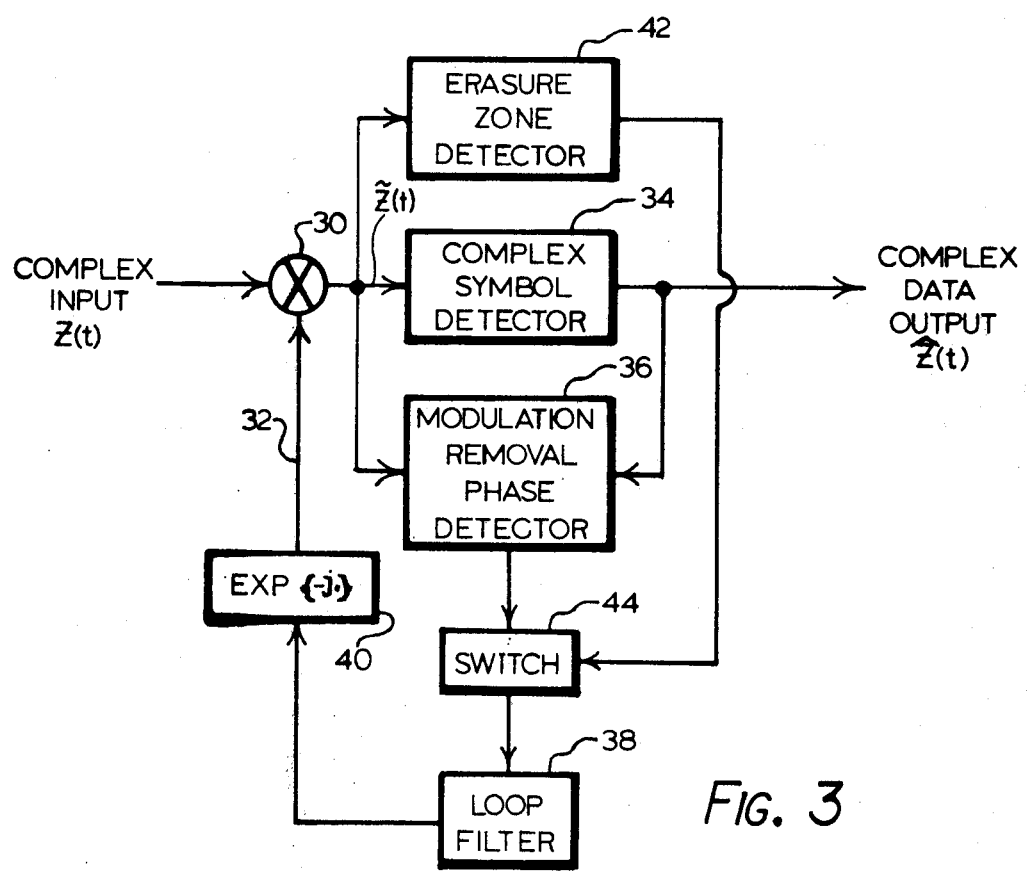
FIG. 3 is a block diagram schematically illustrating signal detection circuitry including an erasure zone decision feedback phase lock loop in accordance with the present invention.

Referring now to FIG. 3 of the drawing, a detection circuit including an erasure zone decision feedback phase lock loop in accordance with the present invention is shown. The circuit is similar to the above-described prior art circuit in that it includes a demodulating multiplier 30, a complex symbol detector 34, a modulation removal phase detector 36, a loop filter 38 and a complex exponential signal generator 40, but differs from the prior art circuit in that it further includes an erasure zone detector 42 which determines whether or not the demodulated complex input signal point falls within an erasure zone, and a switch 44 which is positioned to interrupt the connection between phase detector 36 and loop filter 38 in response to an erasure zone detection by detector 42.

Since the function of phase detector 36 is to generate an error signal proportional to the difference between the demodulated complex input signal $\tilde{Z}(t)$, sometimes referred to as the demodulated baseband signal and the complex data output signal $\hat{Z}(t)$, and to input such signal to the loop filter 38 for development of a phase reference signal at the input 32 of multiplier 30, the operative effect of erasure zone detector 42 and switch 44 is to prevent the input to filter 38 of those error signals which are considered highly likely to be erroneous; more specifically, those signals which fall within the erasure zones.

Figure 4:
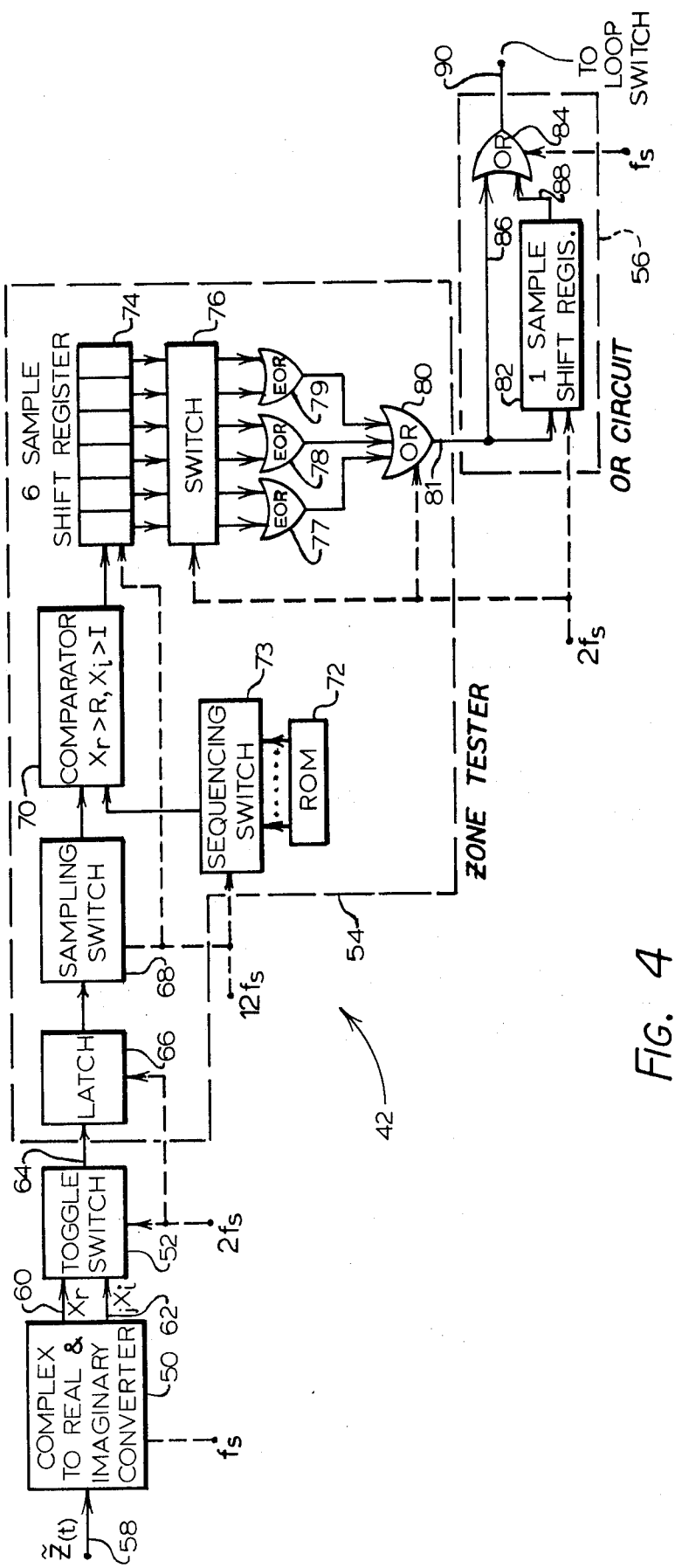
FIG. 4 is a block diagram schematically illustrating the principal operative components of an erasure zone detector in accordance with the present invention.

In FIG. 4, the principal operative components of a preferred embodiment of the erasure zone detector 42 are illustrated and as shown include a complex to real and imaginary converter 50, a toggle switch 52, a zone tester 54, and an OR circuit 56.

Converter 50 is a conventional circuit which separates the demodulated complex input signal $\tilde{Z}(t)$ appearing on line 58 into its real and imaginary components $X_r$ and $jX_i$, respectively, and at a clock rate $f_s$ simultaneously outputs these signals on the lines 60 and 62 as indicated. Toggle switch 52 is a conventional switching circuit which switches at a rate $2f_s$ and alternately couples its output line 64 to the inputs 60 and 62 so that the component signals $X_r$ and $jX_i$ are alternately input to the zone tester 54.

Zone tester 54 includes a latch 66 which is clocked at a rate $2f_s$ to receive the input from switch 52 and hold each input until it can be sampled by a sampling switch 68 and input to a comparator 70. Comparator 70 sequentially compares $X_r$ to each of a predetermined set of erasure zone boundary values such as $R_1-R_6$, as illustrated in FIG. 2, that are stored in ROM 72, shifts binary signals indicating the results of the comparison (e.g., a level greater than the reference will produce a binary 1 signal) to a shift register 74, and then repeats the same operation to compare $X_i$ to a set of erasure zone boundary values such as those illustrated in FIG. 2 as $I_1-I_6$ and which are also stored in ROM 72. Note that sampling switch 68 and sequencing switch 73 are switched at a rate $12f_s$ and as a result signals are output from comparator 70 at the same rate.

When register 74 is filled with the completed test results for one signal, e.g., $X_r$, a switch 76 is energized to input adjacent pairs of the stored data into exclusive OR (EOR) gates 77, 78 and 79 which in turn generate binary 1 signals for input to an OR gate 80 if the signal state of both signals in the respective pairs of signals are dissimilar. In the event that the output of any of the EOR gates is a binary 1, OR gate 80 will cause a binary 1 output, i.e., an erasure signal, to be developed and input to a one-bit shift register 82 of OR circuit 56 and that signal will be retained in register 82 until register 54 performs a like operation on the $X_i$ components and outputs a corresponding signal on line 81. Upon the occurrence of the next clock signal $f_s$, an OR gate 84 will respond to the signals appearing on its inputs 86 and 88, and if either input is a binary 1 and thus indicates that one of the components $X_r$ or $X_i$ lies within an erasure zone, an output will be developed on line 90 which actuates the switch 44 (FIG. 3) to prevent the corresponding output of phase detector 36 from being input to loop filter 38. As a result, the phase reference signal fed back for input at 32 to multiplier 30 is not updated.

Figure 5:
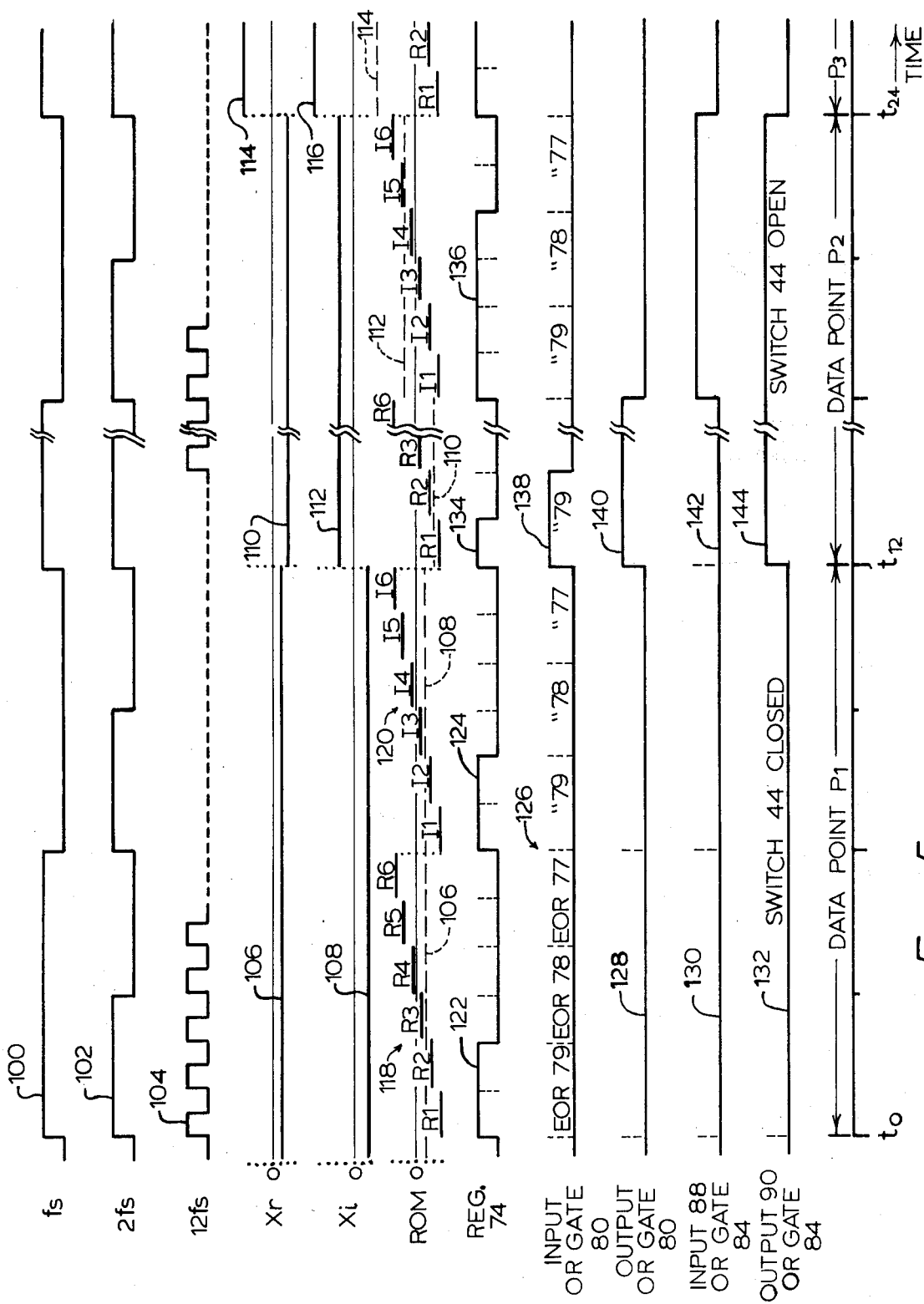
FIG. 5 is a timing diagram illustrating operation of the present invention.

To further illustrate operation of the present invention, reference is made to the timing diagram of FIG. 5 which shows in representational form operation of the components illustrated in FIG. 4 for the three data points $P_1$, $P_2$ and $P_3$ illustrated in FIG. 2 of the drawing. For reference purposes, clock pulses at frequencies $f_s$, $2f_s$ and $12f_s$ are illustrated at 100, 102 and 104, respectively. The complex plane coordinates $X_r$ and $X_i$ for the $P_1$, $P_2$ and $P_3$, respectively, are illustrated in analog form at 106 and 108, 110 and 112, and 114 and 116. The analog values of the erasure zone boundaries $R_1-R_6$ and $I_1-I_6$ are illustrated at 118 and 120, respectively.

Assuming now the comparator 70 is of the type that develops a binary 1 when the received signal is greater than the reference signal and develops a binary 0 when the compared signal is less than the reference signal, it will be noted at 122 that as a result of the comparison of the $P_1$ component $X_r$ to the reference levels $R_1-R_6$, the comparison signal data stored in shift register 74 is in the form 110000, and as a result of the comparison of the $P_1$ component $X_i$ to the reference levels $I_1-I_6$, the comparison signal data subsequently stored in shift register 74 is in the form 110000, as illustrated at 124. Since the inputs of this data and AND gates 77, 78 and 79 are all in terms of pairs of like data, the respective outputs of the EOR gates will be binary 0, as indicated at 126, and as a result of the output of OR gate 80 will be a 0. Consequently, the output of OR gate 84 and OR circuit 56 (and thus the output of erasure zone detector 42) will likewise be a 0 as indicated at 128 and 132, respectively. Switch 44 will thus remain closed and the output of phase detector 36 will be input to loop filter 38.

Tracing the same operation for the complex plane coordinates of the point $P_2$, which lies within an erasure zone of the second quadrant as illustrated in FIG. 2, it will be noted that the comparison signal content of register 74 for the real component is in the form 100000, as indicated at 134 in FIG. 5, and as the content of register 74 for the imaginary component of point $P_2$ will be 111100, as illustrated at 136. Further tracing these signals through the EOR gates will indicate that gate 79 will have a 1 output for $X_r$ as indicated at 138 and as a result the output of OR gate 80 will go high and develop an erasure signal as indicated at 140. When the delayed output 142 and the output 140 are simultaneously input to OR gate 84, the gate output at 90 (FIG. 4) will go high, as indicated at 144, thus causing switch 44 (FIG. 3) to open and prevent the output of phase detector 36 from being input to loop filter 38.

Following a similar analysis for the coordinates of the point $P_3$, which lies outside of the erasure zones in complex plane quadrant I, it will be noted that the output of OR circuit 56 is a logical 0 and thus switch 44 will again be closed to couple the output of phase detector 36 to loop filter 38.

Although the present invention has been described in terms of a system using four-level quadrature amplitude shift keying (4×4 QASK) modulation, it is likewise applicable to biphase (BPSK) and quadriphase (QPSK) modulation formats. Furthermore, the concept can also be extended to other constellations that do not have orthogonal boundary lines, but the implementation would be somewhat more complicated due to the complex shapes of the erasure zones.

The erasure zone decision feedback phase lock loop offers the greatest advantage in high order modulation systems such as those using 4×4 QASK modulation since higher order modulation has a greater number of potential symbols and the likelihood of error is greater in the presence of phase error. Although the width of the erasure zones may be adjusted for optimal performance, if the zones are made too narrow, one will in effect have a conventional decision feedback loop. On the other hand, if the zones are made too wide, the phase correction will take place too infrequently to track any phase changes induced by the channel. Therefore, an optimum zone width must be determined for each application.

Although the present invention has been described in terms of a presently preferred embodiment, it is contemplated that various alterations and modifications may become apparent to those skilled in the art after having read the preceding disclosure. It is specifically envisioned that the invention would be particularly amenable to an embodiment in a microprocessor where the method would be implemented in the form of a coded program residing in a special read-only (ROM) or read/write memory. It is therefore intended that the appended claims be interpreted as covering all such alterations and modifications as fall within the true spirit and scope of the invention.

What is claimed is:

1. In a feedback phase-lock loop of the type used in data communications systems transmitting constellation encoded data and including a demodulating multiplier for receiving the transmitted complex input signal and multiplying it by a feedback signal to develop a demodulated complex input signal, a complex symbol detector for detecting the particular constellation point received, a modulation removal phase detector which compares the demodulated complex input signal to the detected signal and generates a difference signal proportional to the difference therebetween, a loop filter which serves to smooth out differences between successive difference signals input thereto, and an exponential circuit responsive to said filtered difference signals and operative to develop said feedback signal for input to the demodulating multiplier, the improvement comprising:
   an erasure zone detector for monitoring the output of said demodulating multiplier and for determining whether or not the demodulated complex input signal falls within one of a predetermined number of erasure zones lying within the complex plane of a particular modulation constellation and for developing a switch control signal when it is determined that the demodulated complex input signal does in fact fall within one of said erasure zones; and
   switching means responsive to said switch control signal and operative to interrupt the input of said difference signals into said loop filter and to thereby prevent adjustment of said feedback signal when the coordinates of a demodulated complex input signal falls within one of said erasure zones.

2. In a feedback phase lock loop as recited in claim 1 wherein said erasure zone detector includes
   means for converting said demodulated complex input signal to corresponding real and imaginary component signals,
   means for testing each said component signal to determine whether or not the component signal falls within one of said erasure zones, and for generating an erasure signal for each component signal falling within one of said zones, and
   means responsive to said erasure signals and operative to develop said switching signal.

3. In a feedback phase lock loop as recited in claim 2 wherein said erasure zone detector further includes switching means for alternately inputting said real component signal and said imaginary component signal into said testing means, and wherein said testing means includes means for storing predetermined zone determining signals, comparator means for comparing each said component signal to said stored signals and for developing comparison signals when a predetermined relationship exists therebetween, and means responsive to said comparison signals and operative to develop said erasure signals when said comparison signals have a predetermined characteristic.

4. A feedback phase lock loop for use in a data communications system for detecting transmitted constellation encoded data comprising:
   means for receiving a transmitted complex input signal and multiplying it by a feedback signal to develop a demodulated input signal;
   means for detecting the particular constellation point included in the demodulated input signal;
   means for comparing said demodulated input signal to the detected signal and for generating a difference signal proportional to any difference therebetween;
   means for filtering out differences between successive difference signals input thereto;
   means for converting the filtered difference signal into said feedback signal for input to said multiplying means;
   means for monitoring said demodulated input signals input to said detecting means, for determining whether or not said demodulated input signal falls within one of a predetermined number of erasure zones lying within the complex plane of a particular modulation constellation, and for developing a control signal when it is determined that said demodulated input signal falls within one of said erasure zones; and
   means responsive to said control signal and operative to prevent the corresponding difference signal from being input to said filtering means such that no adjustment of said feedback signal is made when a demodulated input signal falls within one of said erasure zones.

5. A feedback phase lock loop as recited in claim 4 wherein said monitoring means includes
   means for converting said demodulated input signal to corresponding real and imaginary component signals,
   means for testing each said component signal to determine whether or not it falls within one of said erasure zones, and for generating an erasure signal for each component signal falling within one of said zones, and means responsive to said erasure signals and operative to develop said control signal.

6. A feedback phase lock loop as recited in claim 5 wherein said monitoring means further includes means for alternately inputting said real component signals and said imaginary component signals into said testing means and wherein said testing means includes means for storing predetermined zone determining signals, means for comparing each said component signal to said stored signals and for developing comparison signals when a predetermined relationship exists therebetween, and means responsive to said comparison signals and operative to develop said erasure signals when said comparison signals have a predetermined characteristic.

* * * * *